United States Patent [19]
Mikami et al.

[11] Patent Number: 5,956,440
[45] Date of Patent: *Sep. 21, 1999

[54] OPTICAL TRANSMISSION LINE FOR WAVELENGTH DIVISION MULTIPLEXED OPTICAL SIGNALS

[75] Inventors: Satoshi Mikami; Seiji Watanabe, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,140

[22] Filed: Jan. 2, 1997

[30] Foreign Application Priority Data

Jan. 10, 1996 [JP] Japan ..................... 8-001853

[51] Int. Cl.$^6$ .............. G02B 6/28; H04J 14/02; H04B 10/00
[52] U.S. Cl. .............. 385/24; 385/123; 359/124; 359/127; 359/161
[58] Field of Search .................. 385/24, 37, 27, 385/123; 359/124, 127, 161, 164, 173

[56] References Cited

U.S. PATENT DOCUMENTS

| | | | |
|---|---|---|---|
| 5,361,319 | 11/1994 | Antos et al. | 385/123 |
| 5,473,719 | 12/1995 | Stone | 385/123 |
| 5,532,868 | 7/1996 | Gnauck et al. | 359/332 |
| 5,629,795 | 5/1997 | Suzuki et al. | 359/337 |
| 5,642,215 | 6/1997 | Suzuki et al. | 359/161 |
| 5,696,614 | 12/1997 | Ishikawa et al. | 359/124 |
| 5,778,128 | 7/1998 | Wildeman | 385/123 |
| 5,781,673 | 7/1998 | Reed et al. | 385/123 |

FOREIGN PATENT DOCUMENTS

| | | |
|---|---|---|
| 0 657 754 | 6/1995 | European Pat. Off. . |
| 0 684 709 | 11/1995 | European Pat. Off. . |
| 62-275204 | 11/1987 | Japan . |
| 8-234255 | 9/1996 | Japan . |
| 2 268 018 | 12/1993 | United Kingdom . |

*Primary Examiner*—Hemang Sanghavi
*Attorney, Agent, or Firm*—Young & Thompson

[57] ABSTRACT

Wavelength division multiplexed optical signals with different wavelength dispersion are compensated for wavelength dispersion in a optical transmission line. Each multiplexed wavelength $\lambda 1$–$\lambda n$ is selected by band pass filters 11-1–11-n. The selected optical signal for each wavelength is independently compensated for the wavelength dispersion by wavelength dispersion compensation sections 12-1–12-n. The wavelength dispersion compensation section of each wavelength has a optical fiber having a dispersion value with polarity opposite to that of the optical transmission line. Zero dispersion is attained for each wavelength $\lambda 1$–$\lambda n$ as a whole, and transmission distance of wavelength division multiplexed optical signals can be extended.

8 Claims, 4 Drawing Sheets

OPTICAL TRANSMISSION LINE FOR WAVELENGTH DIVISION MULTIPLEXED OPTICAL SIGNALS

BACKGROUND OF THE INVENTION

The present invention relates to an optical transmission line for wavelength division multiplexed optical signals, and, more particularly, to a wavelength dispersion compensation system for an optical transmission line in an optical wavelength division multiplex transmission repeating system which uses an optical direct amplifier.

In an optical communication system using an optical fiber as the transmission line, wavelength dispersion compensation is performed due to wavelength dispersion characteristics of the optical fiber. Japanese Laid-open Patent Application No. 62-275204 discloses technology of the wavelength dispersion compensation system. A wavelength dispersion compensator (WDC) is provided to compensate for wavelength dispersion on an optical fiber, which is an optical transmission line between a transmitter and a receiver. The wavelength dispersion compensator is arranged to compensate for wavelength dispersion by the optical transmission line so that entire wavelength dispersion from the transmitter to the receiver is made equivalent to zero. The wavelength dispersion compensator makes the entire wavelength dispersion substantially zero by using optical fiber which has a wavelength dispersion value whose polarity is opposite to that of the optical transmission line, and by controlling the length of the optical fiber.

When such conventional wavelength dispersion compensation system is applied to an optical wavelength division multiplex (WDM) transmission line, there arises the following problem. Assume that the multiplexed wavelengths are n wavelengths of $\lambda 1 - \lambda n$ (n being integer of 2 or more), and that n optical signals with different wavelengths are multiplexed, transmitted and repeated over transmission lines. In such system, if the wavelength dispersion characteristics of the dispersion compensator are defined by an optical fiber optics which provides zero dispersion characteristics for an optical signal wavelength of $\lambda n$, the wavelength dispersion of the other optical signals having wavelength $\lambda 1 - \lambda (n-1)$ still remains.

The conventional dispersion compensation system compensates for the wavelength dispersion of an optical signal of wavelength $\lambda n$ so that the dispersion becomes zero. However, this compensation is ineffective for the other optical signals of wavelength $\lambda 1 - \lambda (n-1)$.

SUMMARY OF THE INVENTION

It is, therefore, an object of the present invention to provide an optical transmission line for wavelength division multiplexed optical signals which can compensate for wavelength dispersion so that the dispersion becomes substantially zero for each wavelength transmitted in the optical transmission line.

An optical transmission line for wavelength division multiplexed optical signals of the present invention comprises an optical fiber, and at least one wavelength division multiplex dispersion compensator for compensating for wavelength dispersion of each optical signal of the wavelength division multiplexed optical signals.

The wavelength division multiplex dispersion compensator comprises an optical coupler for making the wavelength division multiplexed optical signals branch, a plurality of band pass filters for selecting a optical signal with a predetermined wavelength from the branched wavelength division multiplexed optical signals, and a plurality of wavelength dispersion compensation sections for compensating the wavelength dispersion of the selected optical signal.

An optical signal transmitting method of the present invention comprises the steps of making wavelength division multiplexed optical signals branch, selecting an optical signal with a predetermined wavelength from the branched wavelength division multiplexed optical signals, compensating for the wavelength dispersion of the selected optical signal and coupling each compensated optical signal.

In this optical transmission line and optical signal transmitting method, there is provided an advantage that each optical signal with different wavelength dispersion in the optical transmission line can be compensated for wavelength dispersion.

BRIEF DESCRIPTION OF THE DRAWINGS

The above and other objects, features and advantages of the present invention will become apparent from the following detailed description, when taken with the accompanying drawings, in which.

DESCRIPTION OF THE PREFERRED EMBODIMENT

To better understand the present invention, a brief reference will be made to the conventional wavelength dispersion compensation method shown in FIGS. 1 and 2.

Figure 1:
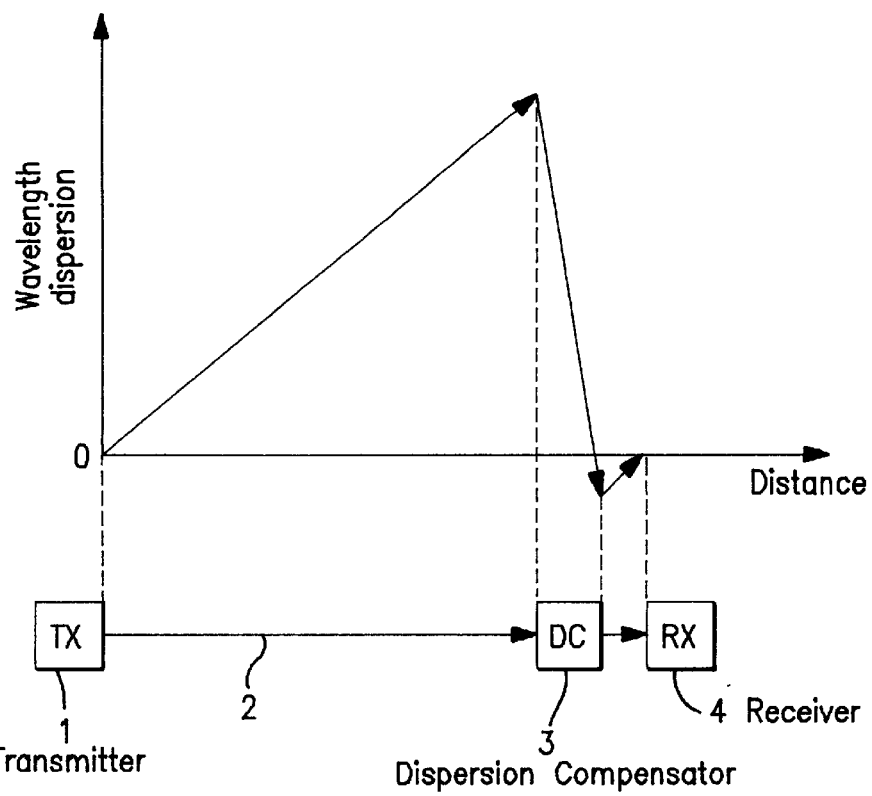
FIG. 1 is a diagram illustrating an example of a conventional wavelength dispersion compensation method.

Referring to FIG. 1, a wavelength dispersion compensator (DC) 3 is provided immediately before a receiver (RX) 4 to compensate for the wavelength dispersion on the optical fiber 2 which is an optical transmission line between a transmitter (TX) 1 and the receiver (RX) 4. The wavelength dispersion compensator 3 is arranged to compensate for the wavelength dispersion by the optical transmission line 2 so that the entire wavelength dispersion from the transmitter 1 to the receiver 4 is made substantially equivalent to zero. The wavelength dispersion compensator 3 makes entire wavelength dispersion substantially zero by using optical fiber which has a wavelength dispersion value of a polarity opposite to that of the optical transmission line 2, and by controlling the length of the optical fiber.

Figure 2:
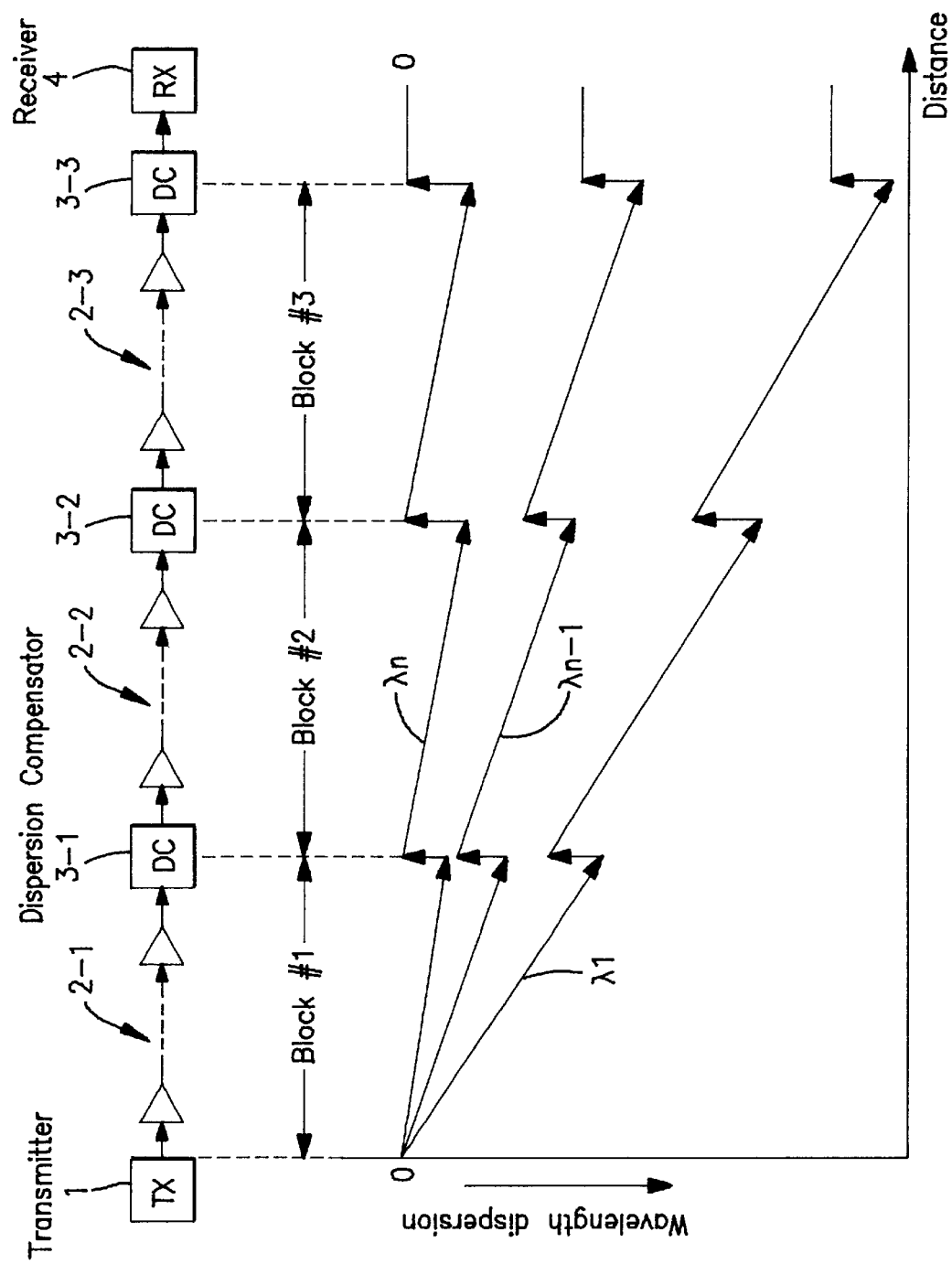
FIG. 2 is a system configuration of an optical transmission line to which a conventional wavelength dispersion compensation method is applied, and its wavelength dispersion characteristics.

FIG. 2 shows such a conventional wavelength dispersion compensation system applied to an optical wavelength division multiplex (WDM) transmission line. In this case, the multiplexed wavelengths are n wavelengths of $\lambda 1 - \lambda n$ (n being integer of 2 or more), and optical signals with n wavelengths are multiplexed, transmitted and repeated over transmission lines 2-1–2-3 (each triangle in the transmission line represents an optical amplifier). The transmission line between the transmitter 1 and the receiver 4 is divided into, for example, three blocks #1–#3. Wavelength dispersion compensators 3-1–3-3 are disposed in correspondence to each block #1–#3 so as to compensate for the wavelength dispersion of the transmission lines 2-1–2-3 in each block #1–#3.

In such system, if the wavelength dispersion characteristics of the dispersion compensators 3-1–3-3 are defined by an optical fiber which provides zero dispersion characteristics for optical signal wavelength of $\lambda n$, the relationship of the wavelength dispersion value to the distance for each wavelength $\lambda 1-\lambda n$ is as shown by the lower graphs in FIG. 2. That is, there is a problem that the conventional dispersion compensation system compensates for the dispersion of an optical signal having one wavelength of $\lambda n$ so that the dispersion becomes zero. However, this compensation is ineffective for the other optical signals having wavelengths of $\lambda 1-\lambda (n-1)$.

Figure 3:
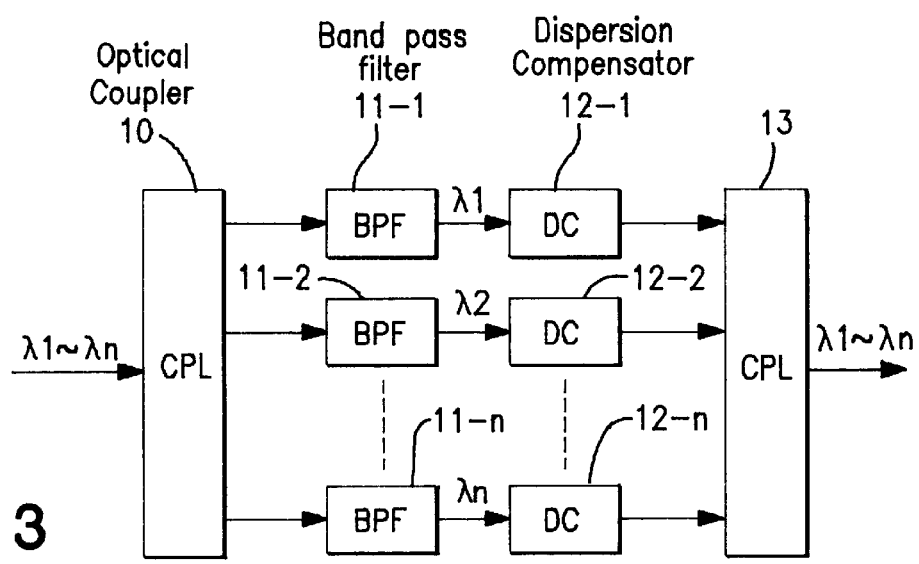
FIG. 3 is a block diagram of an embodiment of a wavelength division multiplex compensator of the present invention.

FIG. 3 is a block diagram of the wavelength dispersion compensator (WDC) according to an embodiment of the present invention. In FIG. 3, the wavelength division multiplexed optical signals (with wavelength of $\lambda 1-\lambda n$) inputted from an optical transmission line are branched into n by an optical coupler (CPL) 10, and input into BPFs (band pass filters) 11-1–11-n for selecting a wavelength. Each optical signal with wavelength of $\lambda 1-\lambda n$ selected by BPFs 11-1–11-n is input for each wavelength into the wavelength dispersion compensation sections 12-1–12-n for wavelength dispersion compensation. Each optical signal after the compensation is coupled again by the optical coupler 13, and introduced into the optical transmission line. The above-described elements constitute a wavelength division multiplex dispersion compensator (WDC).

Figure 4:
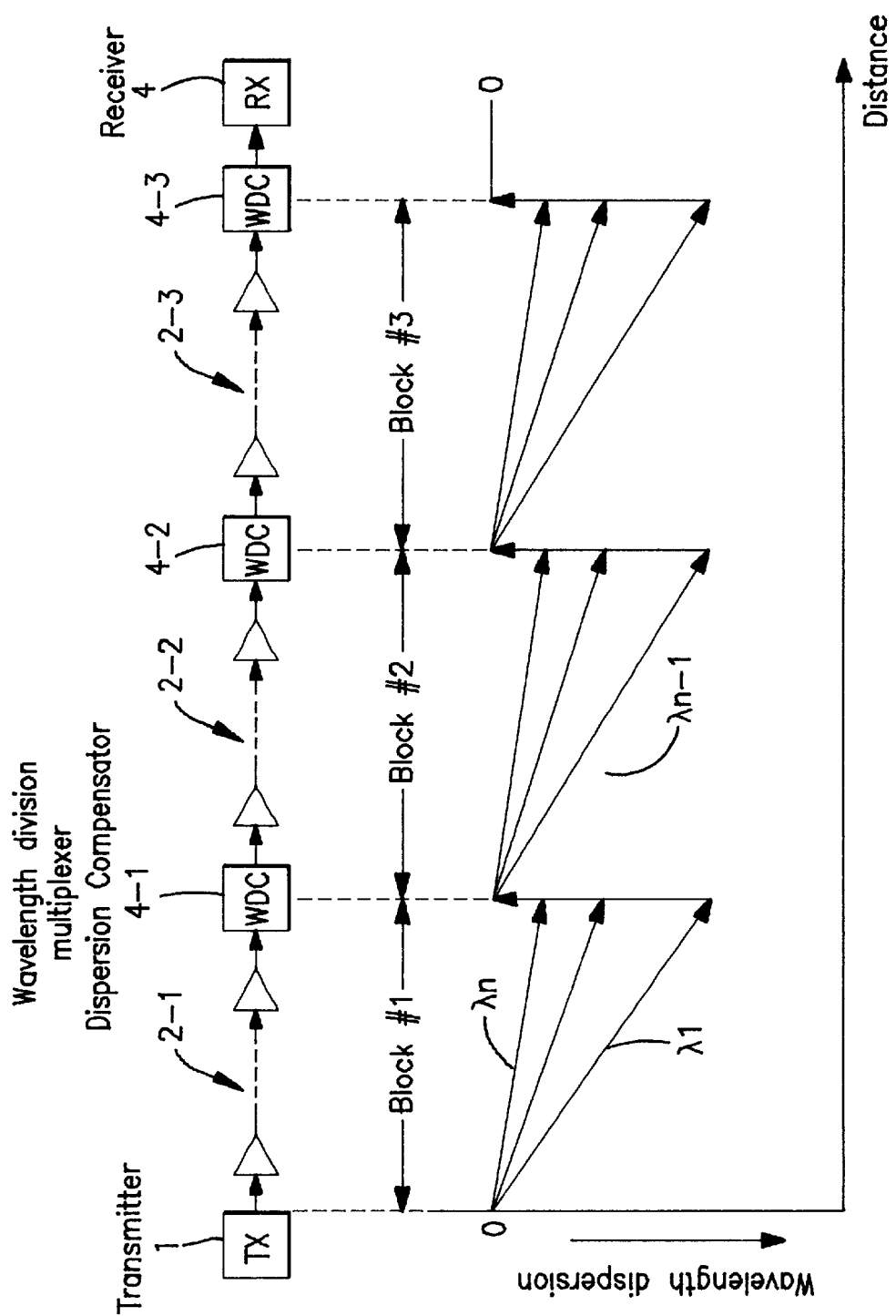
FIG. 4 is a system configuration of an optical transmission line to which the embodiment of the present invention is applied, and its wavelength dispersion characteristics.

FIG. 4 shows a system block diagram and a wavelength dispersion characteristic diagram of the optical transmission line using the wavelength dispersion compensator of FIG. 3. The components similar to those of FIG. 1 are designated by like references. The optical transmission line from the transmitter 1 to the receiver 2 is divided into three blocks of #1–#3 in this example. The wavelength division multiplex dispersion compensators (WDCs) 4-1–4-3 of FIG. 3 are disposed at the end of each block, respectively.

With such arrangement, the optical signals with four wavelength $\lambda 1-\lambda n$ are considered, with n=4. Then, it is assumed that $\lambda 1=1{,}556$ nm, $\lambda 2=1{,}557$ nm, $\lambda 3=1{,}558$ nm, and $\lambda 4=1{,}559$ nm, and that each optical fiber 2-1–2-3 of the transmission line is a so-called dispersion shifted fiber (DSF) with a zero dispersion wavelength of 1,563 nm and dispersion inclination factor of about 0.07 ps/nm²/km. Now, when the transmission distance of each block #1–#3 is 800 km, total dispersion value of each wavelength is:

D1 ($\lambda 1$)=−392 ps/nm     (1)

D2 ($\lambda 2$)=−336 ps/nm     (2)

D3 ($\lambda 3$)=−280 ps/nm     (3)

D4 ($\lambda 4$)=−224 ps/nm     (4).

Here, the formula for calculating the total dispersion values D1–D4 at each wavelength is represented by $D = (0.07 \text{ ps/nm}^2/\text{km}) \times (\lambda - 1{,}563 \text{ nm}) \times 800 \text{ km}$.

The optical transmission lines 2-1–2-3 have a negative (−) dispersion value for each wavelength $\lambda 1-4$.

The total dispersion values D1–D4 for these wavelengths $\lambda 1-\lambda 4$ are compensated in dispersion compensation sections 12-1–12-4 for each wavelength for each block as shown in FIG. 3 by the wavelength division multiplex dispersion compensators (WDCs) 4-1–4-3, each WDC having the structure shown in, for example, FIG. 3. Then, the wavelength dispersion is made zero, or substantially zero, at the end of each block #1–#3.

Figure 5:
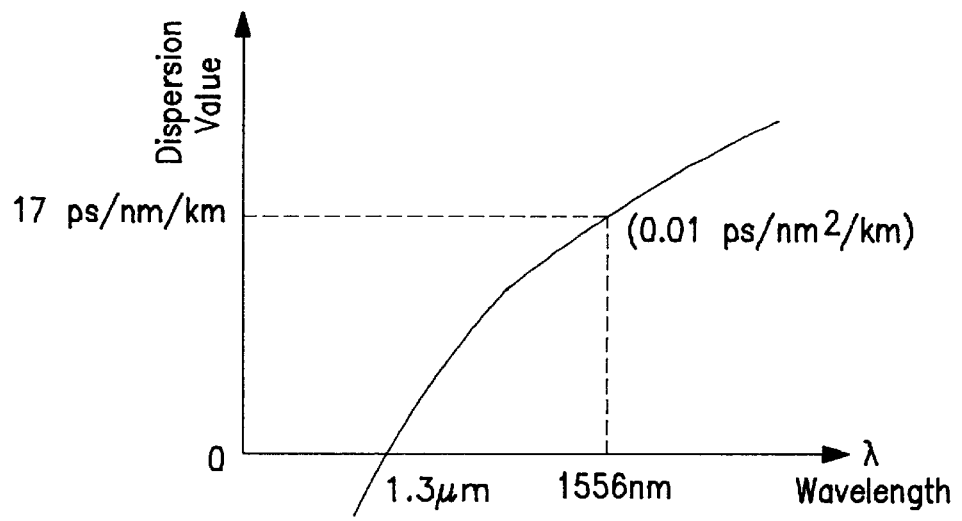
FIG. 5 is an example of characteristics of a dispersion compensation fiber in a wavelength division multiplex dispersion compensator.

To this end, a zero dispersion fiber of 1.3 $\mu$m, for example, is used as the dispersion compensation sections 12-1–12-4. The 1.3 $\mu$m zero dispersion fiber has the dispersion inclination factor 0.01/ps/nm²/km at wavelength $\lambda 1=1{,}556$ nm as shown in FIG. 5 which depicts a graph of its wavelength dispersion characteristics.

The dispersion values per km for each wavelength of the dispersion compensation fiber are:

17.00 ps/nm/km (at $\lambda 1=1{,}556$ nm)

17.01 ps/nm/km (at $\lambda 2=1{,}557$ nm)

17.02 ps/nm/km (at $\lambda 3=1{,}558$ nm)

17.03 ps/nm/km (at $\lambda 4=1{,}559$ nm).

Therefore, to compensate for each of the dispersion values by a transmission line of 800 km, as expressed by equations (1)–(4) so as to equivalently attain substantially zero dispersion as a whole in each block, it is effective to select the following length for each dispersion compensation fiber:

23.1 km (at $\lambda 1=1{,}556$ nm)

19.8 km (at $\lambda 2=1{,}557$ nm)

16.5 km (at $\lambda 3=1{,}558$ nm)

13.2 km (at $\lambda 4=1{,}559$ nm).

Then, the dispersion compensation value for each wavelength is:

D1'=+392 ps/nm     (5)

D2'=+336 ps/nm     (6)

D3'=+280 ps/nm     (7)

D4'=+224 ps/nm     (8).

The polarity symbol is reversed to that of each dispersion value in equations (1)–(4) so that the dispersion compensation can be attained.

Each dispersion compensation fiber is wound around a cable drum to align at one position. Then, all wavelength dispersion by the transmission lines 2-1–2-3 can be compensated at one point at each WDC 4-1–4-3, as shown by the graph in FIG. 4.

The optical transmission line can have an optical fiber with a positive dispersion value for each wavelength. Then the wavelength dispersion compensation section has a transmission channel which may be, for example, an optical fiber with a negative dispersion value so that the dispersion compensation can be attained.

Furthermore, the optical transmission line and the wavelength dispersion compensation section can have an optical fiber with a positive dispersion value for part of the wavelengths and the negative dispersion value for the other wavelengths.

Figure 6:
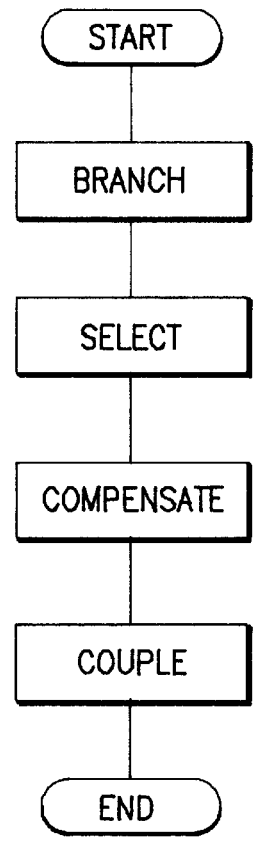
FIG. 6 is a flow charts which shows an optical signal transmitting method of the present invention.

FIG. 6 shows an embodiment of an optical signal transmitting method of the invention. At first, the wavelength division multiplexed optical signals are branched. The optical signal with predetermined wavelength are selected from each of the plurality of branched signals. Each of selected optical signals are compensated for a wavelength dispersion and coupled together.

As described above, the present invention is arranged to perform the wavelength dispersion compensation for each wavelength division multiplexed optical signal wavelength. There is provided an advantage in that all of the optical signal wavelengths with different wavelength dispersion characteristics can be simultaneously and completely compensated for wavelength dispersion, and the transmission distance can be extended.

While the present invention has been described in connection with certain preferred embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. A long-distance optical transmission line for transmitting wavelength division multiplexed optical signals of plural predetermined wavelengths, comprising:

plural optical transmission line sections connected in series one to another for transmitting wavelength division multiplexed optical signals; and plural compensators, each of said plural optical transmission line sections being terminated by one of said plural compensators, each of said plural compensators comprising:

an optical coupler for branching the transmitted wavelength division multiplexed optical signals into plural branched signals, a plurality of band pass filters, each of said plural band pass filters operatively connected to an output of said optical coupler and tuned to one of the plural predetermined wavelengths for selectively passing a single predetermined wavelength, a plurality of wavelength dispersion compensation sections for compensating the single predetermined wavelengths, each of said plural wavelength dispersion compensation sections comprising a length of a dispersion compensation fiber sized to compensate for a wavelength dispersion associated with one of the predetermined wavelengths over a line length of one of said plural optical transmission line sections, and an output optical coupler connected to an output of each of said plurality of wavelength dispersion compensation sections for coupling the compensated single predetermined wavelengths.

2. The long-distance optical transmission line of claim 1, wherein said optical transmission line sections comprise optical fiber having a dispersion polarity value opposite to that of said dispersion compensation fiber for the plural predetermined wavelengths.

3. The long-distance optical transmission line of claim 1, wherein one of said optical transmission line sections has a negative dispersion polarity value for the plural predetermined wavelengths and said predetermined type dispersion compensation fiber has a positive dispersion polarity value for the plural predetermined wavelengths.

4. The long-distance optical transmission line of claim 1, wherein, said length of said predetermined type dispersion compensation fiber of each of said plural wavelength dispersion compensation sections is at least 10 km.

5. A long-distance transmission method for transmitting a wavelength division multiplexed optical signal of plural predetermined wavelength signals, comprising the steps of:

providing plural optical transmission line sections of variable length connected in series one to another;

terminating each of said plural optical transmission line sections with a compensator;

transmitting the wavelength multiplexed optical signal through each of said plural optical transmission line sections; and at a terminating end of each of said plural optical transmission line sections, compensating a transmitted wavelength multiplexed optical signal for wavelength dispersion associated with a just-traversed optical transmission line section, said wavelength dispersion compensation comprising the steps of:

utilizing an optical coupler to branch the transmitted wavelength division multiplexed optical signal into a plurality of branched signals, passing each of the branched signals through one of plural band pass filters tuned to one of a predetermined wavelength corresponding to one of the plural predetermined wavelength signals so that each of said plural band pass filters decouples one of the plural predetermined wavelength signals from the branched signals, wavelength dispersion compensating each of the decoupled predetermined wavelength signals utilizing lengths of dispersion compensation fibers, each of said dispersion compensation fibers being of the same type and sized to compensate for a particular wavelength and a particular cable length corresponding to an associated decoupled predetermined wavelength signal and a line length of said just-traversed optical transmission line section, and recoupling the compensated predetermined wavelength signals to restore the wavelength division multiplexed optical signal being transmitted.

6. The method of claim 5, wherein said step of providing plural optical transmission line sections of variable length, utilizes optical transmission line sections comprising optical fiber having a dispersion value of a polarity opposite to that of said predetermined type dispersion compensation fiber.

7. The method of claim 5, wherein said step of providing plural optical transmission line sections of variable length, comprises the step of providing one of said optical transmission line sections with a negative dispersion value for the plural predetermined wavelength signals and said compensating step comprises the step of operatively connecting to the one of said optical transmission line sections a dispersion compensation fiber having a positive dispersion value for the plural predetermined wavelength signals.

8. The method of claim 6, wherein, said step of providing plural optical transmission line sections of variable length further comprises the step of providing at least three line sections of at least 800 km length each.

* * * * *